(No Model.)
J. FEHRENBATCH.
CANE MILL.
No. 304,813. Patented Sept. 9, 1884.
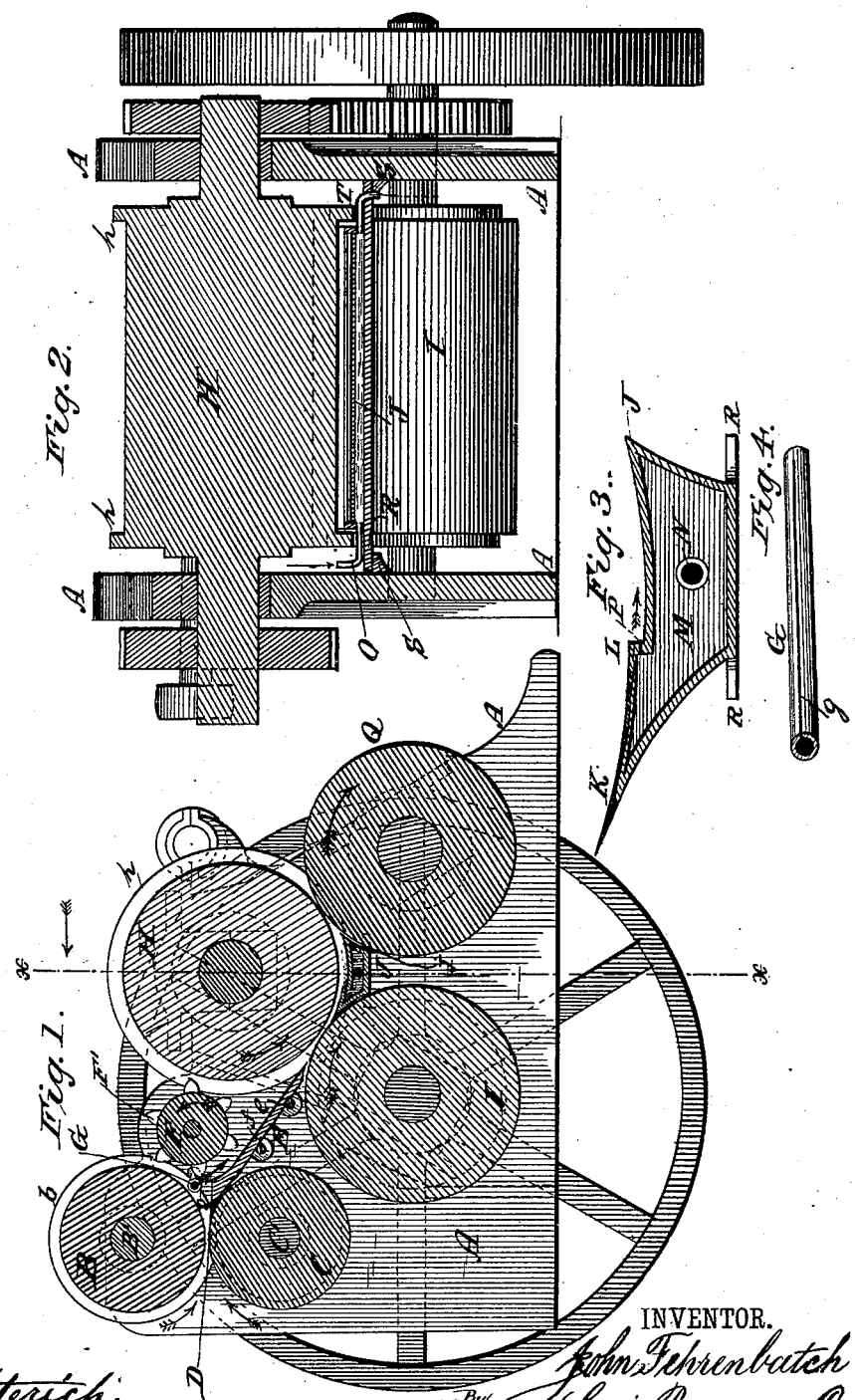
WITNESSES:
Fred. G. Dieterich
Arthur L. Morsell
INVENTOR.
John Fehrenbatch
By Louis Bagger & Co.
ATTORNEYS.

UNITED STATES PATENT OFFICE.

JOHN FEHRENBATCH, OF CINCINNATI, OHIO, ASSIGNOR OF TWO-THIRDS TO DAVID W. McCLUNG, OF SAME PLACE.

CANE-MILL.

SPECIFICATION forming part of Letters Patent No. 304,813, dated September 9, 1884.

Application filed November 17, 1883. (No model.)

*To all whom it may concern:*

Be it known that I, JOHN FEHRENBATCH, a citizen of the United States, and a resident of Cincinnati, in the county of Hamilton and State of Ohio, have invented certain new and useful Improvements in Cane-Mills; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal vertical sectional view of my improved cane-mill. Fig. 2 is a cross-section of the same on line $x$ $x$, Fig. 1, looking in the direction of the arrow. Fig. 3 is a sectional view, on an enlarged scale, of the steam pan or chamber; and Fig. 4 is a perspective view of the slitted steam-pipe.

Similar letters of reference indicate corresponding parts in all the figures.

My invention has relation to that class of cane-mills in which the cane is subjected to the action of jets of steam alternately with pressure of the rollers while passing through the mill, thereby dissolving the crystals of sugar and increasing the yield of juice; and it consists in the improved construction and combination of parts of such a machine, as hereinafter more fully described and claimed.

In the accompanying drawings, the letter A indicates the frame of the mill, which may be of any desired construction, forming bearings for the gudgeons or axles of the several rollers, and provided with suitable means for collecting the expressed cane-juice.

B and C are the feed-rollers, having axles B' and C', and journaled in the upper portion of one end of the frame, the upper one, B, of which rollers has a flange, $b$, at its ends, corresponding to and fitting into a shoulder or step formed upon the ends of the lower feed-roller, preventing the cane from slipping out at the ends of the rollers when being pressed or spread by the pressure.

An inclined chute, E, having a platform, D, at its upper end, and secured in the frame by means of bolts $e$, passing through the sides of the frame and through perforated lugs $f$, extends downwardly-inclined from the feed-rollers, and a cutting or chopping cylinder, F, is journaled above the inclined chute, and provided with slitting or chopping knives F', which I prefer to arrange so as to cut lengthwise with the direction of the revolution, the edges of the knives being at right angles to the axis of the cylinder.

A steam-pipe, G, having a longitudinal slit, $g$, is secured transversely above the upper end of the inclined chute, its slit opening so as to emit a continuous sheet of steam upon the inclined chute, and down nearly parallel with the same. The lower end of the inclined chute nearly impinges upon one, I, of the three pressure-rollers H, I, and Q, which rollers are journaled in suitable adjustable bearings, the upper one, H, bearing against portions of the surfaces of the two lower rollers. The upper roller, H, is provided with a flange, $h$, at each end, fitting into the shouldered ends of the lower rollers, and preventing the crushed cane from spreading over the ends of the rollers, and in the space between the two lower rollers is placed a steam pan or chamber, J, forming a step, L, or offset at its upper portion, and an extended edge, K, which nearly impinges upon the roller I.

A steam-pipe, N, having an inlet, O, and outlet T, enters a chamber, M, formed under the top of the pan or chamber, and the entire chamber is secured to the sides of the frame by means of lugs R, the steam thus heating the pan, and the vertical rearwardly-facing side of the offset or shoulder L has a transverse slit, P, through which a continuous sheet of steam is emitted parallel with the top of the pan, and in the direction of the rear or discharge end of the pan.

A suitable bagasse-carrier may be placed at the rear end of the frame, or any other suitable means for disposing of the bagasse, the drawings showing no such means, as they are not included in my improvements.

The direction of the revolution of the several rollers, which are rotated by suitable connections and gearings, is indicated by arrows.

The cane is fed in between the feed-rollers, the bearings of which are yielding, so as to yield to any unevenness of the layer of cane fed, and passes onto the platform at the upper end of the inclined chute and down upon the latter, in which passage it is subjected to the action of the slitting or chopping cylinder, which exposes the interior of the cane to the action of the sheet of steam passing out of the slit pipe, the steam dissolving the crystals of sugar contained in the cane, and at the same time by its force loosening the fibers of the same, rendering it in a condition fit to yield the most juice when pressed. From the lower end of the inclined chute the cane, which is now soft and quite disintegrated or loosened in its consistence, passes between the periphery of the upper pressure-roller and the forward roller, I, of the lower pressure-rollers, the juice passing over the top of the lower roller, between it and the lower edge of the inclined chute, while the pressed cane passes down upon the steam-pan, where the heat will serve to dissolve the remaining sugar crystals, together with the sheet of steam passing out of the transverse slit in the shoulder of the pan, which, coming from below and passing under the crushed cane, will again loosen it and dissolve the sugar. The crushed cane, thus heated and loosened, will thereupon pass between the periphery of the upper pressure-roller and the rear one, Q, of the lower rollers, which will express the remaining juice and dissolved sugar, which passes between the rear lower roller and the rear edge of the steam-pan, while the bagasse passes out between the rollers and is disposed of in any suitable manner.

It will thus be seen that the slitted or chopped cane is first subjected to a disintegrating and dissolving stream or sheet of steam from above the layer of cane, thereupon pressed, again subjected to a disintegrating and dissolving stream or sheet of steam, this time from below the layer of cane, together with heat, and then finally pressed, thus thoroughly working the cane; and it will also be seen that by having the steam passing out in one continuous unbroken sheet through the slits all the cane in the layer will be subjected to its action, no particle of cane remaining untouched; so, also, the slits will easier clean themselves from any impurities collected in them than perforations in the steam-pipes now in general use in this kind of mills, for the reason that the impurities will be forced by the steam to slide along the slit, if they are too large to pass through it, forcing them into the discharge end of the steam-pipe, from whence they are carried off by the exhaust-steam, while, in perforated pipes, the perforations will catch and detain the impurities.

It follows that the steam-pipes, which may lead from the boiler, supplying the steam for running the mill, or from any other suitable steam-generator, may be provided with any approved means for regulating the flow of steam.

Having thus described my invention, I claim and desire to secure by Letters Patent of the United States—

1. The combination, in a cane-mill, of an upper pressure-roller, two lower pressure-rollers journaled below and to both sides of the said upper roller, and a steam pan or chamber forming an offset in its top, having a transverse slit in its rearwardly-facing side adapted to emit a continuous unbroken sheet of steam parallel with the surface of the pan or chamber, the said steam pan or chamber being placed below the periphery of the upper roller and between the lower rollers, as and for the purpose shown and set forth.

2. The combination, in a cane-mill, of a downwardly-inclined chute receiving the cane to be pressed, a slitting or chopping cylinder journaled above the said chute, a longitudinally-slitted transverse steam-pipe secured between the upper end of the chute and the slitting or chopping cylinder, an upper pressure-roller, a forward and rear lower pressure-roller, and a steam pan or chamber forming a rearwardly-facing offset having a transverse slit, and placed between the lower rollers, all constructed to operate as and for the purpose shown and set forth.

3. In a cane-mill, the combination of the feed-rollers, the slitted steam-pipe, the slitting or chopping cylinder, the inclined chute secured between the sides of the casing below the slitting or chopping cylinder and the steam-pipe, the three pressure-rollers, arranged as shown, and the steam-pan arranged between the said rollers, and having a steam-outlet, whereby the cane is subjected to the dissolving action of steam as it is received upon and travels over the pan, as and for the purpose shown and set forth.

In testimony that I claim the foregoing as my own I have hereunto affixed my signature in presence of two witnesses.

JOHN FEHRENBATCH.

Witnesses:
LOUIS BAGGER,
AUGUST PETERSON.